United States Patent Office 3,162,685
Patented Dec. 22, 1964

3,162,685
N-METHYL-5-CYCLOHEXYLSALICYLAMIDE
John A. Faust and Melville Sahyun, Santa Barbara, Calif.; said Faust assignor to said Sahyun, doing business as Sahyun Laboratories, Santa Barbara, Calif.
No Drawing. Filed Sept. 10, 1962, Ser. No. 222,626
1 Claim. (Cl. 260—559)

This invention relates to a composition of matter classified in the art of chemistry as a salicylamide compound and to processes for using such a composition as a fungicide.

The invention sought to be patented, in its composition aspect, resides in the concept of a chemical compound having the molecular structure N-methyl-5-cyclohexylsalicylamide.

The invention sought to be patented, in its process of use aspect, resides in the concept of alleviating pathogenic fungal infections by contacting the locus of the infection with N-methyl-5-cyclohexylsalicylamide.

The tangible embodiment of this invention is a colorless crystalline solid, insoluble in water but soluble in alcohol, which possesses the inherent applied use characteristic of exhibiting fungicidal activity when evaluated according to standard test procedures.

The manner and processes of making and using this invention is illustrated by the following general description and examples, which set forth the best mode contemplated by us of carrying out the invention so as to enable any person skilled in the art of chemistry to make and use the same:

N-methyl-5-cyclohexylsalicylamide may be prepared from the corresponding acid in the usual manner or by an ammonolysis reaction of a 5-cyclohexyl-salicylate ester with aqueous methylamine. Even though it may involve an extra step, the ammonolysis method is preferred. The ester is most conveniently prepared from the corresponding acid which in turn is prepared by the catalytic reduction of 5-phenylsalicylic acid.

The compound of this invention, N-methyl-5-cyclohexylsalicylamide, exhibits outstanding specific fungicidal potency when tested against *Tricophyton mentagrophytes* and *Microsporum Gypseum* at concentrations of 0.004 and 0.002 milligram per milliliter, respectively. The two test microorganisms are pathogenic fungi that cause infection of the skin, hair, and/or nails. In addition to its high fungicidal potency, N-methyl-5-cyclohexylsalicylamide has a low oral toxicity, approximately 1.5–2.0 grams per kilogram of body weight. The unusual specificity of N-methyl-5-cyclohexylsalicylamide is indicated by the fact its position isomers, N-methyl-3-cyclohexylsalicylamide and N-methyl-4-cyclohexylsalicylamide, failed to exhibit the above-mentioned high anti-microbiologic activity. Halogenation of the aryl moiety of the active agent also destroyed this specific fungicidal potency.

The invention is further illustrated by the following preparations and examples.

*5-cyclohexylsalicylic acid.*—A solution of 8.0 grams (0.037 mole) of 5-phenylsalicylic acid in 150 milliliters of glacial acetic acid was hydrogenated at approximately 50 degrees centigrade under an initial hydrogen pressure of 50 pounds per square inch using 0.15 gram of platinum oxide as the catalyst. The calculated amount of hydrogen was absorbed during six hours. The cooled mixture was filtered, and the filtrate was distilled to a volume of approximately 20 milliliters and diluted with water to precipitate 6.9 grams, or an 84.5 percent yield, of 5-cyclohexylsalicylic acid melting 148–150 degrees centigrade. Recrystallization from dilute acetic acid raised the melting point to 149–150 degrees. The neutral equivalent calculated for $C_{13}H_{16}O_3$ is 220; the neutral equivalent found was 219.

*Phenyl 5-cyclohexylsalicylate.*—A mixture of 50 grams (0.23 mole) of 5-cyclohexylsalicylic acid, 30 grams (0.32 mole) of phenol and 15 grams (0.1 mole) of phosphorous oxychloride was heated at approximately 90 degrees centigrade for one hour, cooled somewhat and poured into water. The insoluble oil was taken up in ether and the ether solution was washed with dilute sodium carbonate and dried. After the ether was removed, the residue was subjected to distillation at 1.4 millimeters of mercury pressure using an oil bath heated to 230 degrees centigrade in order to remove the residual phenol. The residue was a clear, glass-like material weighing 52 grams which was used directly in the next step.

*N-methyl-5-cyclohexylsalicylamide.*—Five grams of the phenyl-5-cyclohexyl-salicylate prepared above was heated at 90 degrees centigrade with a large excess of 40 percent aqueous methylamine. The solution was poured into an excess of dilute hydrochloric acid and the solid which separated was purified by repeated recrystallization from dilute methanol. The yield was 2.0 grams of N-methyl-5-cyclohexylsalicylamide melting 106–107 degrees centigrade.

Calculated for $C_{14}H_{19}NO_2$: N, 6.00. Found: N, 5.92.

N-methyl-5-cyclohexylsalicylamide is used as a fungicide by contacting the locus of the infection with the compound preferably in alcoholic solution. Aqueous systems may also be employed provided that the compound is first dissolved in an excess of the alcohol or glycol used as the solvent before its addition to the aqueous vehicle. Other convenient systems for application of N-methyl-5-cyclohexylsalicylamide will be apparent to those skilled in the art.

The subject matter which the applicants regard as their invention is distinctly pointed out and claimed as follows:
N-methyl-5-cyclohexylsalicylamide.

References Cited in the file of this patent
UNITED STATES PATENTS

| | | |
|---|---|---|
| 2,729,678 | Sahyun et al. | Jan. 3, 1956 |
| 2,730,544 | Sahyun et al. | Jan. 10, 1956 |
| 2,751,410 | Sahyun et al. | June 19, 1956 |
| 2,880,137 | Elson | Mar. 31, 1959 |
| 3,013,051 | Richter | Dec. 12, 1961 |
| 3,019,161 | Garai | Jan. 30, 1962 |

OTHER REFERENCES

Faust et al.: Jour. Amer. Pharm. Assoc., vol. 45, pages 514–7 (1956).

Pilcher et al.: Chem. Abstracts, vol. 51, page 14121 (1957).